(12) United States Patent
Ah Lee (10) Patent No.: US 7,701,919 B2
(45) Date of Patent: Apr. 20, 2010

(54) METHOD OF ASSIGNING UPLINK REFERENCE SIGNALS, AND TRANSMITTER AND RECEIVER THEREOF

(75) Inventor: Jung Ah Lee, Pittstown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1024 days.

(21) Appl. No.: 11/414,402

(22) Filed: May 1, 2006

(65) Prior Publication Data

US 2008/0123616 A1   May 29, 2008

(51) Int. Cl.
  *H04B 7/208* (2006.01)
  *H04J 1/00* (2006.01)
  *H04B 7/216* (2006.01)
(52) U.S. Cl. ............... 370/344; 370/485; 370/342; 370/335
(58) Field of Classification Search ............ 370/344, 370/342, 485, 335
  See application file for complete search history.

(56) References Cited

U.S. PATENT DOCUMENTS

| | | | |
|---|---|---|---|
| 6,536,024 B1 * | 3/2003 | Hathaway | 716/6 |
| 7,379,741 B2 * | 5/2008 | Ahn et al. | 455/450 |
| 2001/0040882 A1 * | 11/2001 | Ichiyoshi | 370/342 |
| 2002/0051436 A1 * | 5/2002 | Ertel et al. | 370/335 |
| 2002/0126650 A1 * | 9/2002 | Hall et al. | 370/349 |
| 2002/0172180 A1 * | 11/2002 | Hall et al. | 370/342 |
| 2004/0240400 A1 * | 12/2004 | Khan | 370/280 |
| 2004/0246998 A1 * | 12/2004 | Ma et al. | 370/527 |
| 2005/0237989 A1 * | 10/2005 | Ahn et al. | 370/343 |
| 2006/0009227 A1 * | 1/2006 | Cudak et al. | 455/450 |
| 2006/0039296 A1 * | 2/2006 | Nakamata et al. | 370/252 |

(Continued)

FOREIGN PATENT DOCUMENTS

EP       0607755 A1 *   7/1994

(Continued)

OTHER PUBLICATIONS

3GPP TR 25.814 V1.2.2 (Mar. 2006).

(Continued)

*Primary Examiner*—Rafael Pérez-Gutiérrez
*Assistant Examiner*—Allahyar Kasraian
(74) *Attorney, Agent, or Firm*—Harness, Dickey & Pierce (57) ABSTRACT

In an embodiment of the method, uplink reference signals are assigned to users in a group of cells. For example, a first constant amplitude sequence having low cyclic cross correlation is assigned to each user in a first cell of the group of cells. Here, each user is assigned the first sequence. Also, simultaneously transmitting users in the first cell are assigned to different sub-carriers. A second constant amplitude sequence having low cyclic cross correlation is assigned to each user in a second cell of the group of cells. Here, each user in the second cell is assigned the second sequence. The first sequence and the second sequence are different sequences, and the first cell and the second cell are adjacent. Also, simultaneously transmitting users in the second cell are assigned to different sub-carriers. The sub-carriers to which the simultaneously transmitting users of the second cell are assigned overlap in frequency with the sub-carriers to which the simultaneously transmitting users of the first cell are assigned.

15 Claims, 8 Drawing Sheets

U.S. PATENT DOCUMENTS

| | | | |
|---|---|---|---|
| 2007/0047474 A1* | 3/2007 | Anderson | 370/277 |
| 2007/0097901 A1* | 5/2007 | Tirkkonen et al. | 370/318 |
| 2007/0165588 A1* | 7/2007 | McCoy | 370/344 |
| 2007/0183386 A1 | 8/2007 | Muharemovic et al. | |
| 2007/0258404 A1* | 11/2007 | Tirkkonen et al. | 370/329 |
| 2008/0095254 A1* | 4/2008 | Muharemovic et al. | 375/260 |
| 2008/0298438 A1* | 12/2008 | Song | 375/145 |
| 2009/0052470 A1* | 2/2009 | Yun et al. | 370/491 |
| 2009/0227261 A1* | 9/2009 | Tiirola et al. | 455/450 |
| 2009/0268695 A1* | 10/2009 | Zhao et al. | 370/336 |

FOREIGN PATENT DOCUMENTS

| | | |
|---|---|---|
| WO | WO 98/59450 | 12/1998 |
| WO | WO 2007/084988 | 7/2007 |

OTHER PUBLICATIONS

3GPP TR 25.813 V0.8.3 (Apr. 2006).
3GPP TR 25.912 V0.1.2 (Mar. 2006).
3GPP TR 25.913 V7.3.0 (Mar. 2006).
3GPP TSG RAN WG1 Meeting #44bis R1-061066 Athens, Greece, Mar. 27-31, 2006.
3GPP TSG-RAN WG1 Meeting #44bis R1-061094 Athens, Greece, Mar. 27-31, 2006.
3GPP TSG RAN WG1 #44 R1-060373 Denver, Colorado, Feb. 13-17, 2006.
3GPP TSG RAN WG1 Ad Hoc on LTE R1-050822 London, United Kingdom, Aug. 29-Sep. 2, 2005.
3GPP TSG RAN WG1 #44 R1-060388 Denver, Colorado, Feb. 13-17, 2006.
3GPP TSG RAN WG1 Ad Hoc on LTE R1-051062 San Diego, California, Oct. 10-14, 2005.
3GPP TSG RAN WG1 #42 on LTE R1-050851 London, United Kingdom, Aug. 29-Sep. 2, 2005.
3GPP TSG RAN1 #44 R1-060390 Denver, Colorado, Feb. 13-17, 2006.
John C. Ng et al., "*Multi-phase Optimal Sequences for Fast Initialization of Channel Estimation and Equalization*", IEEE International Conference on Communications, vol. 3, Jun. 8, 1997, pp. 1484-1487.
John C. Ng et al., "*Complex Optimal Sequences with Constant Magnitude for Fast Channel Estimation Initialization*", IEEE Transactions on Communications, vol. 46, No. 3, Mar. 1998.
B.M. Popovic, "*GCL Polyphase Sequences with Minimum Alphabets*", vol. 30, No. 2, Jan. 20, 1994.

* cited by examiner

METHOD OF ASSIGNING UPLINK REFERENCE SIGNALS, AND TRANSMITTER AND RECEIVER THEREOF

BACKGROUND OF THE INVENTION

Reference signal design is an important issue to fully exploit the potential gain of the single carrier frequency division multiple access (SC-FDMA) system considered in the uplink of the evolved-UTRA (E-UTRA). The uplink is from user equipment (UE) to a node B. The UE may also be referred to as a mobile unit, mobile station, etc. The UE may be a wireless phone, wireless equipped PDA, a wireless equipped computer, etc. The node B may also be referred to as a base station, base station controller, base station router, etc.

The reference signal sent by a UE to the node B is needed for uplink CQI estimation as well as detection and coherent data demodulation. There has been on-going discussion on the uplink reference or pilot signal structure, and in particular, the pros and cons of code division multiplexing (CDM) and frequency division multiplexing (FDM) pilot structures. FDM involves dividing the bandwidth for sending reference signals into tones or sub-carriers and assigning, for example, different sub-carriers to different UEs. Each UE uses the same pilot sequence, but transmits that pilot sequence over different sub-carriers (i.e., different frequency or bandwidth). Code division multiplexing involves allowing each UE to use the entire bandwidth, but having each UE transmit using a differentiating pilot sequence. Well-known constant amplitude zero autocorrelation sequences (CAZAC) have been proposed as the codes. More specifically, the use of a generalized chirp like (GCL) sequence like a Zadoff-Chu sequence has been proposed. In these proposals, a GCL sequence spanning the bandwidth is chosen. A shifted version of the same GCL sequence is then assigned to each UE to differentiate between UE transmissions.

Desired elements of the SC-FDMA pilot signal design include:
1. Equal channel sounding in the frequency domain
2. Immunity to co-channel interference
3. Support of multiple user resource block sizes
4. Support of both localized and distributed sub-carrier mapping with reliable channel estimation performance
5. Efficient transmitter and receiver structures
6. Large number of sequences with the desired characteristic to support multi-cell deployment The FDM pilot has been advocated because it offers in-cell user orthogonality in the presence of fading. So far, comb-shaped pilots and staggered pilots are the proposed reference patterns for the FDM pilot. One of the major drawbacks of FDM pilots is the impact of dominant co-channel interference. When two users at the cell edge use the same pilot sub-carriers, the channel cannot be estimated reliably due to collision.

SUMMARY OF THE INVENTION

In an embodiment of the method, uplink reference signals are assigned to users in a group of cells. For example, a first constant amplitude sequence having low cyclic cross correlation is assigned to each user in a first cell of the group of cells. Here, each user is assigned the first sequence. Also, simultaneously transmitting users in the first cell are assigned to different sub-carriers. A second constant amplitude sequence having low cyclic cross correlation is assigned to each user in a second cell of the group of cells. Here, each user in the second cell is assigned the second sequence. The first sequence and the second sequence are different sequences, and the first cell and the second cell are adjacent. Also, simultaneously transmitting users in the second cell are assigned to different sub-carriers. The sub-carriers to which the simultaneously transmitting users of the second cell are assigned may overlap in frequency with the sub-carriers to which the simultaneously transmitting users of the first cell are assigned.

In one embodiment, the first and second sequences have a same length. For example, the length may be an odd number 13.

In one embodiment, the first and second sequences have a same length. For example, the length may be number 12. This may be generated by truncating a longer-length sequence such as length 13 sequence.

In another embodiment, the first and second sequences have different lengths. For example, the first and second sequences may have lengths differing by one such as a length of 12 and a length of 13, respectively.

In an embodiment, the first and second sequences are generalized chirp like (GCL) sequences. For example, the first and second sequences may be Zadoff-Chu GCL sequences.

In one embodiment, the assigning sub-carriers to simultaneously transmitting users in the first cell step assigns at least a minimum number of sub-carriers to each simultaneously transmitting user; and the assigning sub-carriers to simultaneously transmitting users in the second cell step assigns at least the minimum number of sub-carriers to each simultaneously transmitting user. For example, the minimum number may be 12.5. In one embodiment, the first and second sequences have lengths dependent on the minimum number.

According to an aspect of the present invention, a transmitter is provided. In one embodiment, a transmitter at a device includes a spreader spreading, in the time domain, a constant amplitude sequence having low cyclic cross correlation by a number of resource blocks assigned to the device. For example, each resource block equals a set number of sub-carriers, and the spreader bit-wise spreads the sequence. A transformer transforms the spread sequence from the time domain to the frequency domain, and a mapper maps frequency domain samples of the transformed spread sequence to sub-carriers. An inverse transformer transforms the sub-carriers to the time domain for transmission.

In one embodiment, the sequence has a length corresponding to the set number of sub-carriers.

In one embodiment, the mapper performs localized mapping, and in another embodiment, distributed mapping is performed.

Another embodiment of the transmitter performs the spreading operation in the frequency domain.

The present invention also provides a receiver. For example, one embodiment of a receiver includes a transformer transforming a time domain signal received from a device to the frequency domain, a de-mapper mapping sub-carriers of the transformed signal to frequency samples, and an inverse transformer transforming the frequency samples to the time domain. A despreader despreads the time domain output of the inverse transformer by a number of resource blocks assigned to the device to obtain a sequence. Here, each resource block equals a set number of sub-carriers. A correlator correlates the obtained sequence with a reference sequence.

In another embodiment, the dispreading operation is performed in the frequency domain.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein.

DETAILED DESCRIPTION OF THE EXAMPLE EMBODIMENTS

The pilot structure of the present invention applies CDM concepts to FDM. For example, UEs in a same cell for simultaneous transmission are assigned the same pilot or reference sequences, but are then transmitted over different sub-carriers; and UEs in a different, adjacent cell may transmit over the same sub-carriers, but are assigned different pilot or reference sequence. First, a discussion of the pilot sequences will be provided.

According to an example embodiment of the present invention, the pilot sequence should have the following properties:

1. Unit magnitude in the transform domain
2. Optimal cyclic auto-correlation
3. Low, constant cyclic cross-correlation for odd-length sequences For example, constant amplitude sequences having low cyclic cross correlation such as CAZAC sequences have these properties. However, it will be understood that the present invention is not limited to CAZAC sequences. As discussed previously, a GCL sequence is a specific example of a CAZAC sequence. An odd-length GCL sequence of length P has optimal cyclic cross correlation of $\sqrt{P}$ and qualifies as a pilot sequence. For the purposes of example only, the embodiments of the present invention will be described using Zadoff-Chu GCL sequences. For example, the Zadoff-Chu sequence of length P in the time domain is generated as:

$$c_k(n) = \begin{cases} \exp\left[\frac{j2\pi k}{P}\left(n + \frac{n(n+1)}{2}\right)\right] & \text{for } P \text{ odd} \\ \exp\left[\frac{j2\pi k}{P}\left(n + \frac{n^2}{2}\right)\right] & \text{for } P \text{ even} \end{cases} \quad (1)$$

Figure 1:
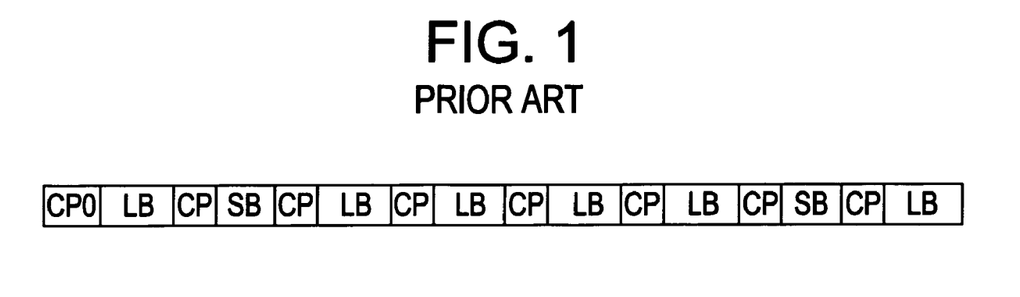
FIG. 1 illustrates an example of the proposed uplink transmission sub-frame structure.

Next, the up-link transmission frame structure win be described. FIG. 1 illustrates an example of the proposed uplink transmission sub-frame structure. Uplink transmissions are from a UE to a node B. The UE may also be referred to as a mobile station, mobile unit, etc. A UE may be a wireless phone, wireless equipped computer, wireless equipped PDA, etc. A node B may also be referred to as a base station, a base station controller, a base station router, etc.

As shown in FIG. 1, the sub-frame structure includes several long block (LBs) and two short blocks (SBs) separated by cyclic prefixes (CPs). The long blocks carry data and the short blocks carry reference signals. The pilot structure according to an example embodiment of the present invention may be transmitted in one or both of the short blocks.

FDM involves dividing the bandwidth of a SB into sub-carriers. For example, for a 5 MHz bandwidth signal, current proposals divide the SB into 150 sub-carriers. Also, in FDM, each UE is assigned a number of the sub-carriers. Current proposals limit the minimum number of pilot sub-carriers that may be assigned to a UE as 12.5. This block of sub-carriers will be referred to as a resource block, and it will be understood that the present invention is not limited to a resource block size of 12.5 sub-carriers. Accordingly, the maximum number of users that can transmit simultaneously in a SB is 12 (=INT(150/12.5). There are a few options to generate the reference or pilot signal of required length to support this maximum number of users while suppressing inter-cell interference:

Option 1: Provide six different sequences of length 13 (e.g., P=13), and six different sequences of length 12 (e.g., P=12) to fit in the SB of 150 pilot sub-carriers. For example, GCL sequences of length P=13 may be used, and the sequences of length 12 may be generated by truncating the GCL sequences of length 13. Unlike conventional differentiation using GCL sequences by phase shifting the same GCL sequence, this embodiment involves using different sequences, but of the same length. For example, in equation (1), P will be 13, but the value of k will change to obtain the different sequences (which are not shifted versions of one another).

Option 2: Use 12 sub-carriers for all resource blocks. Overall, 12×12=144 pilot sub-carriers out of the available 150 sub-carriers are used. While different sequences of length 12 may be used, instead, different sequences of length 13 truncated to length 12 may be used.

Option 3: Use multiple sequences with the lengths corresponding to all possible number of pilot sequences.

Option 4: If the number of allowed pilot sub-carriers is 156, a length-13 sequence may be used.

Figure 2:
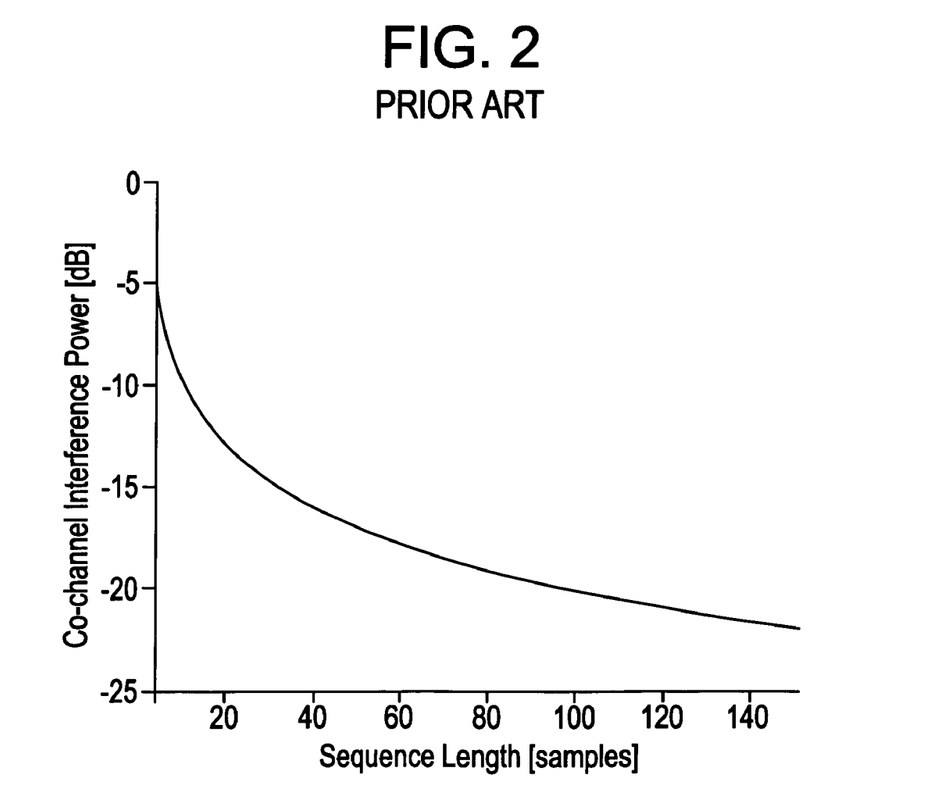
FIG. 2 shows the co-channel interference suppression characteristic of a GCL sequence for sequence lengths ranging from 3 to 150.

FIG. 2 shows the co-channel interference suppression characteristic of a GCL sequence for sequence lengths ranging from 3 to 150. The full-length sequence (sequence of 150 sub-carriers) has the capability to suppress the interference by up to 21.8 dB. Although the shorter sequences in the embodiments of the present invention are not as powerful, most of the gain is obtained with shorter sequences. For sequences with lengths of 13 and 25, that correspond to resource block sizes of 1 and 2, the interference may be suppressed by −11.1 dB and −14.0 dB, respectively.

As will be understood from the discussion above, according to embodiments of the present invention, the length of the reference or pilot signal sequence used by a UE corresponds to the size of the smallest resource block. However, as will be appreciated, more than one resource block may be assigned to a UE. In these instances, the embodiments of the present invention construct longer pilot sequences from the assigned resource block based sequence.

Figure 3:
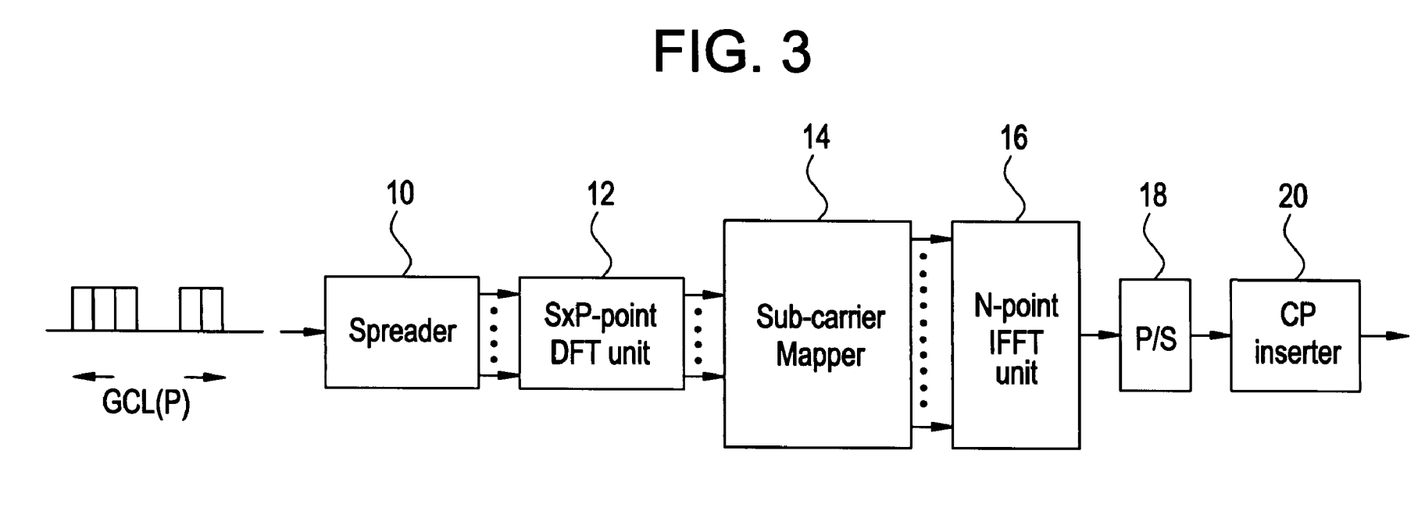
FIG. 3 illustrates a transmitter structure according to an embodiment of the present invention for transmitting a reference signal according to the embodiments of the present invention.
Figure 4:
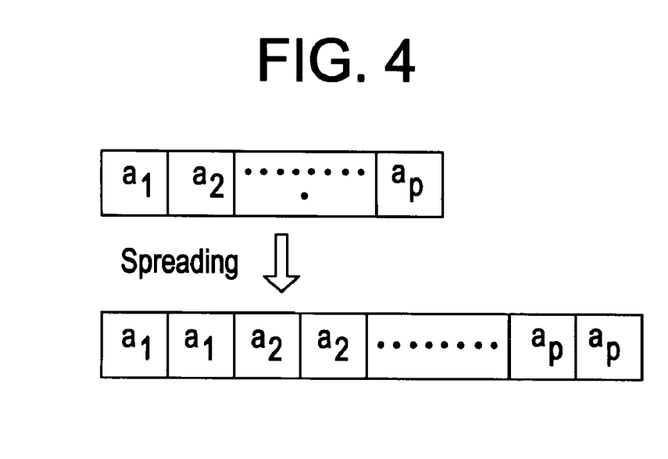
FIG. 4 illustrates the example of spreading a sequence of length P over two resource blocks.

To better understand this aspect of the present invention, a transmitter structure according to an embodiment of the present invention will now be described. FIG. 3 illustrates a transmitter structure according to an embodiment of the present invention for transmitting a reference signal according to the embodiments of the present invention. As shown, a time domain GCL sequence determined according to, for example, option 2 above is supplied to a spreader 10. The spreader 10 spreads the GCL sequence bit-by-bit in the time domain based on the number (S) of resource blocks assigned to the UE. For a user assigned S resource blocks, spreading by S results in a length (S×P) spread sequence. For example, FIG. 4 illustrates the example of spreading a sequence of length P over two resource blocks (i.e., S=2).

Figure 5A:
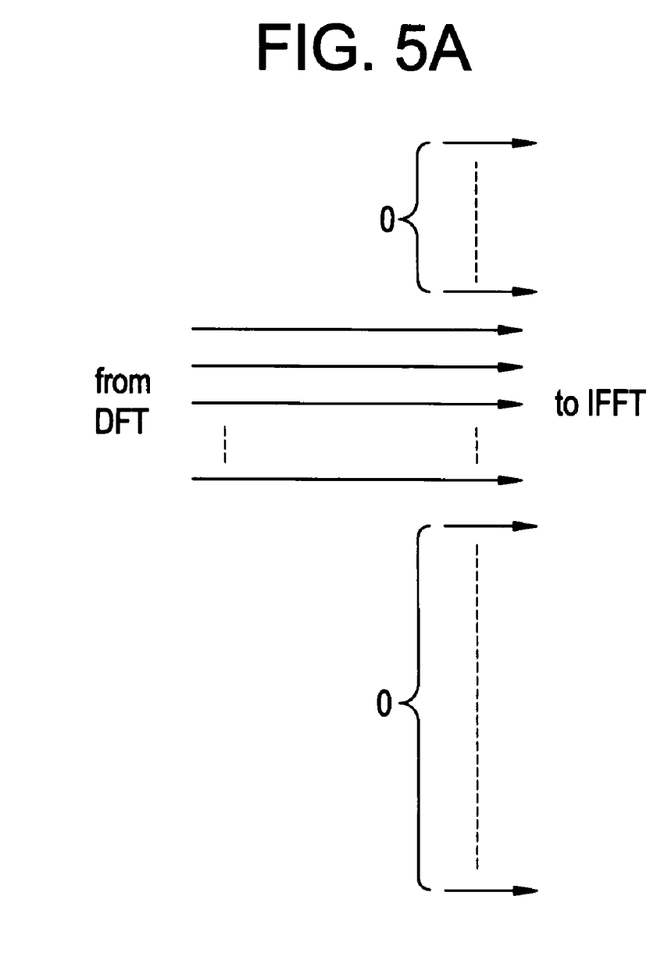
FIGS. 5A and 5B illustrate localized and distributed sub-carrier mapping according to embodiments of the present invention.
Figure 5B:
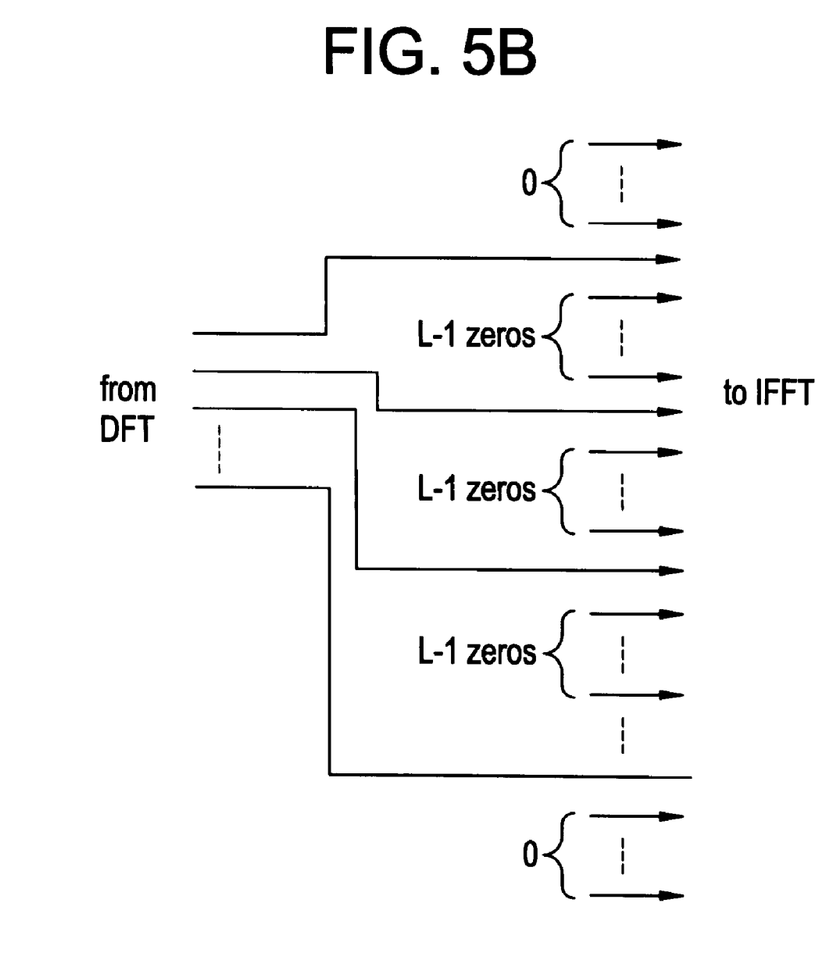

The sequence output from the spreader 10 is discrete Fourier transformed (DFT) by a DFT unit 12 to generate a frequency-domain signal or samples. A sub-carrier mapper 14 then maps the frequency domain samples to sub-carriers to generate localized or distributed FDM reference signals that correspond to the assigned resource block of the UE. Namely, each frequency domain sample is mapped to one of the N inputs of a N-point inverse fast Fourier transform (IFFT) unit 16. The sub-carrier mapping determines which part of the spectrum is used for transmission by inserting a suitable number of zeros at the upper and/or lower end as shown in FIGS. 5A and 5B. Between each frequency domain sample, L−1 zeroes are inserted. A mapping with L=1 corresponds to localized transmission, and the spread sequence is mapped to consecutive sub-carriers. This is shown in FIG. 5A. With L>1, distributed transmission results, as shown in FIG. 5B.

Figure 6A:
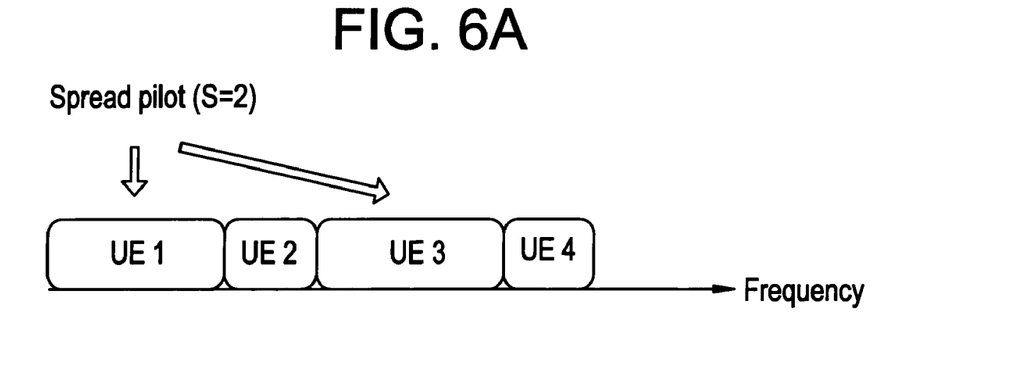
FIGS. 6A and 6B illustrate the pilot structure in the frequency domain for the case of four simultaneously transmitting UEs.
Figure 6B:
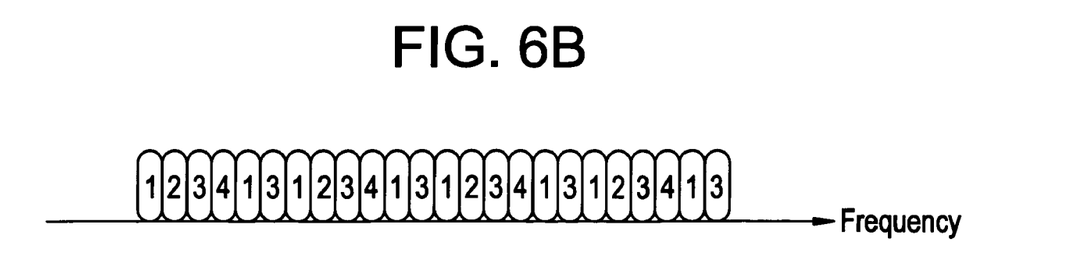

FIGS. 6A and 6B illustrate the pilot structure in the frequency domain for the case of four simultaneously transmitting UEs. FIG. 6A shows localized pilot structures and FIG. 6B shows the distributed pilot structures. Suppose UEs 1 and 3 are assigned 2 resource blocks (S=2) and UEs 2 and 4 are assigned 1 resource blocks (S=1). For UEs 1 and 3, bit-by-bit spreading in the time domain generates a length-S×P reference sequence. For localized data mapping, the sub-carrier mapping generates the localized FDM pilot structure shown in FIG. 6A. For distributed data mapping, the distributed FDM pilot structure shown in FIG. 6B is generated.

Returning to FIG. 3, the resulting sequence of frequency domain samples received by the N-point IFFT 16 is converted to the time-domain. After parallel-to-serial conversion by a parallel-to-serial converter 18, a CP inserter 20 adds a cyclic prefix before the transmission of the reference signal in the SB.

While the transmitter structure of FIG. 3 has been described with respect to the transmission of reference signals such as pilot sequences, this structure as well as the other transmitter and receiver structures described below may be adapted for transmission of data traffic such as voice or control signaling. At the transmitter, the data would undergo encoding at an encoder prior to receipt by the spreader 10 and would undergo modulation (e.g., BPSK, QPSK, 16QAM, etc.) by a modulator after spreading by the spreader 10. This transmitter structure may be particularly applicable to CDMA-OFDAM systems. As will be appreciated, the reverse of the above operations are performed at the receiver.

Figure 7:
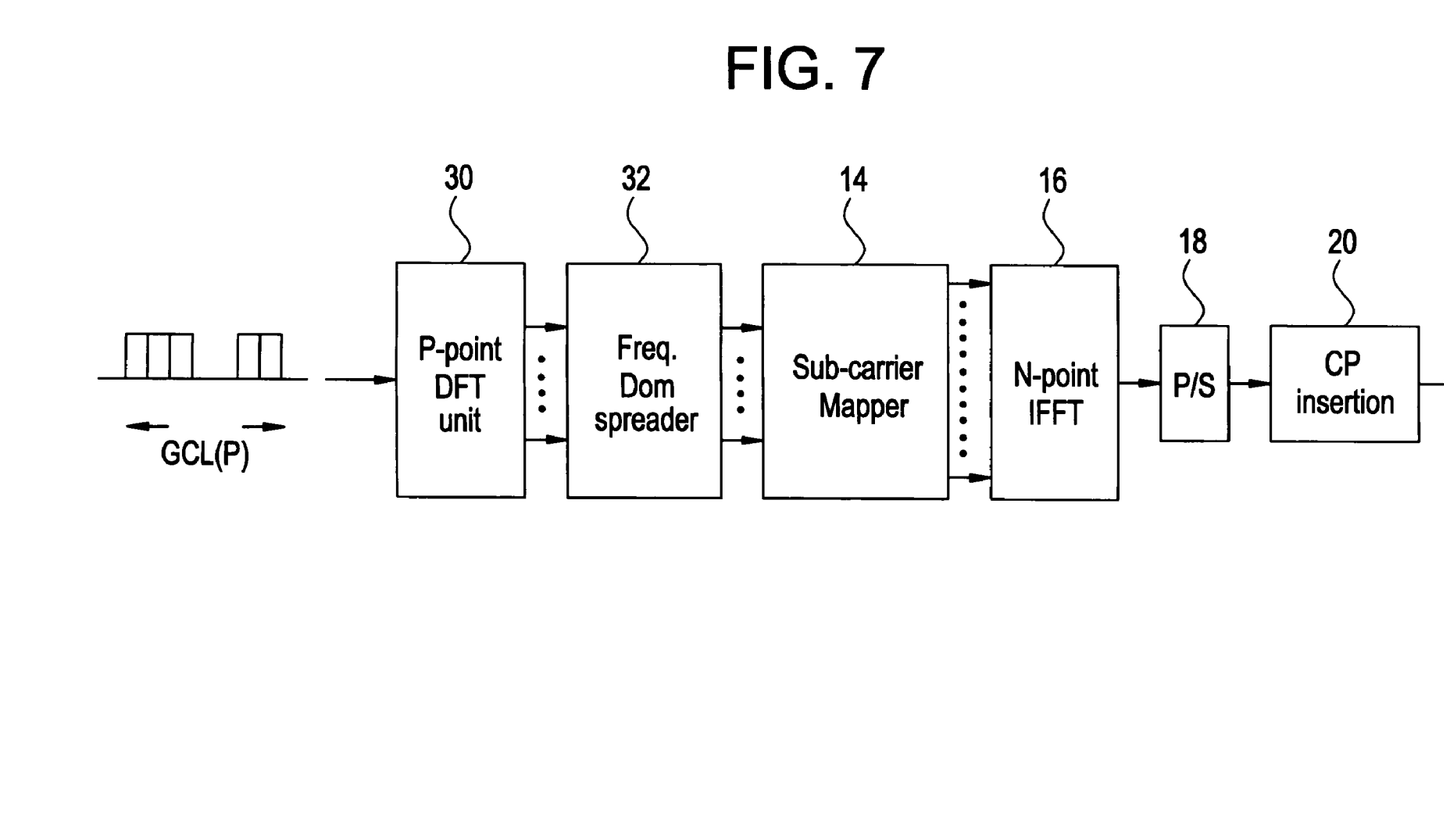
FIG. 7 illustrates another embodiment of a transmitter structure according to the present invention.

Instead of spreading the sequences in the time domain and then performing DFT using the spreader 10 and the S×P DFT unit 12 described above with respect to FIG. 3, the spreading may be performed in the frequency domain. FIG. 7 illustrates another embodiment of a transmitter structure according to the present invention. As shown, this embodiment is the same as the embodiment of FIG. 3, except that the spreader 10 and S×P DFT unit 12 have been replaced by a P-point DFT unit 30 and a frequency domain spreader 32. The P-point DFT unit 30 converts the time domain sequence of length P into frequency domain samples. The frequency domain spreader 32 then spreads the frequency domain samples by the number (S) of resource blocks assigned to the UE to generate S×P frequency domain samples. Accordingly, the output of the frequency domain spreader 32 is the same as the output from the S×P DFT unit 12 in FIG. 3.

Figure 8:
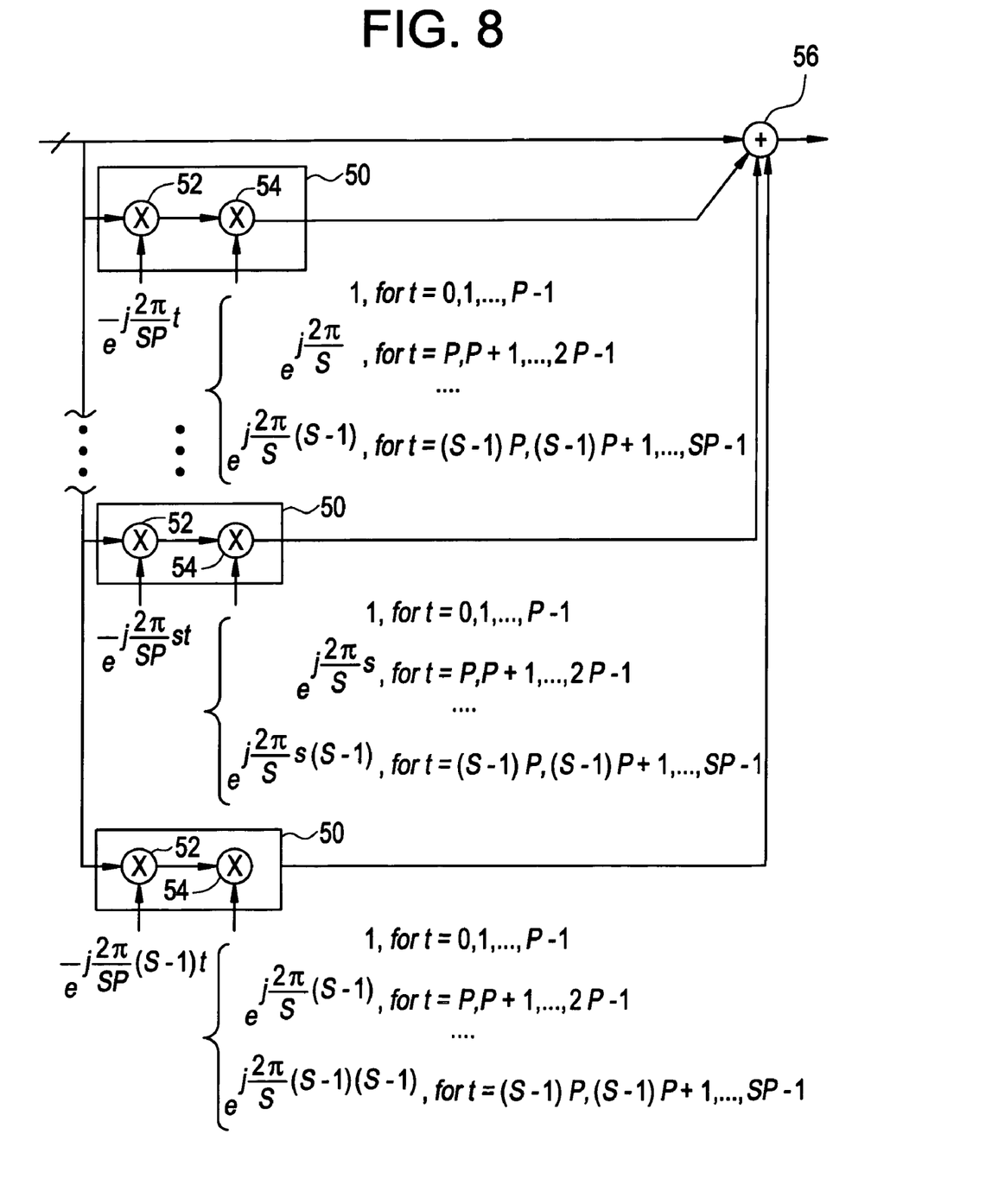
FIG. 8 illustrates one example embodiment of the frequency domain spreader shown in FIG. 7.

FIG. 8 illustrates one example embodiment of the frequency domain spreader 32. As shown, the frequency domain spreader 32 includes S branches 50. Each branch 50 receives the frequency samples output from the P-point DFT unit 30. Each branch 50 includes a first multiplier 52 and a second multiplier 54. The first multiplier 52 phase shifts the frequency samples by the sub-carrier index t of the frequency sample (i.e., frequency sub-carrier index for output of the P-point DFT unit 30). For each branch s=0, 1, . . . , S−1, the phase shift is performed by multiplying the frequency samples by:

$$e^{-j\frac{2\pi}{SP}st} \quad (2)$$

The second multiplier 54 multiples by a constant depending on the frequency sub-carrier range. This is performed by multiplying the output of the first multiplier 52 by:

$$\begin{cases} 1, \text{ for } t = 0, 1, \ldots, P-1 \\ e^{j\frac{2\pi}{S}}, \text{ for } t = P, P+1, \ldots, 2P-1 \\ \ldots \\ e^{j\frac{2\pi}{S}s(S-1)}, \text{ for } t = (S-1)P, (S-1)P+1, \ldots, SP-1 \end{cases} \quad (3)$$

The output of the branches 50 is added to the output of the P-point DFT unit 30 by an adder 56 to produce the spread frequency domain samples.

Figure 9:
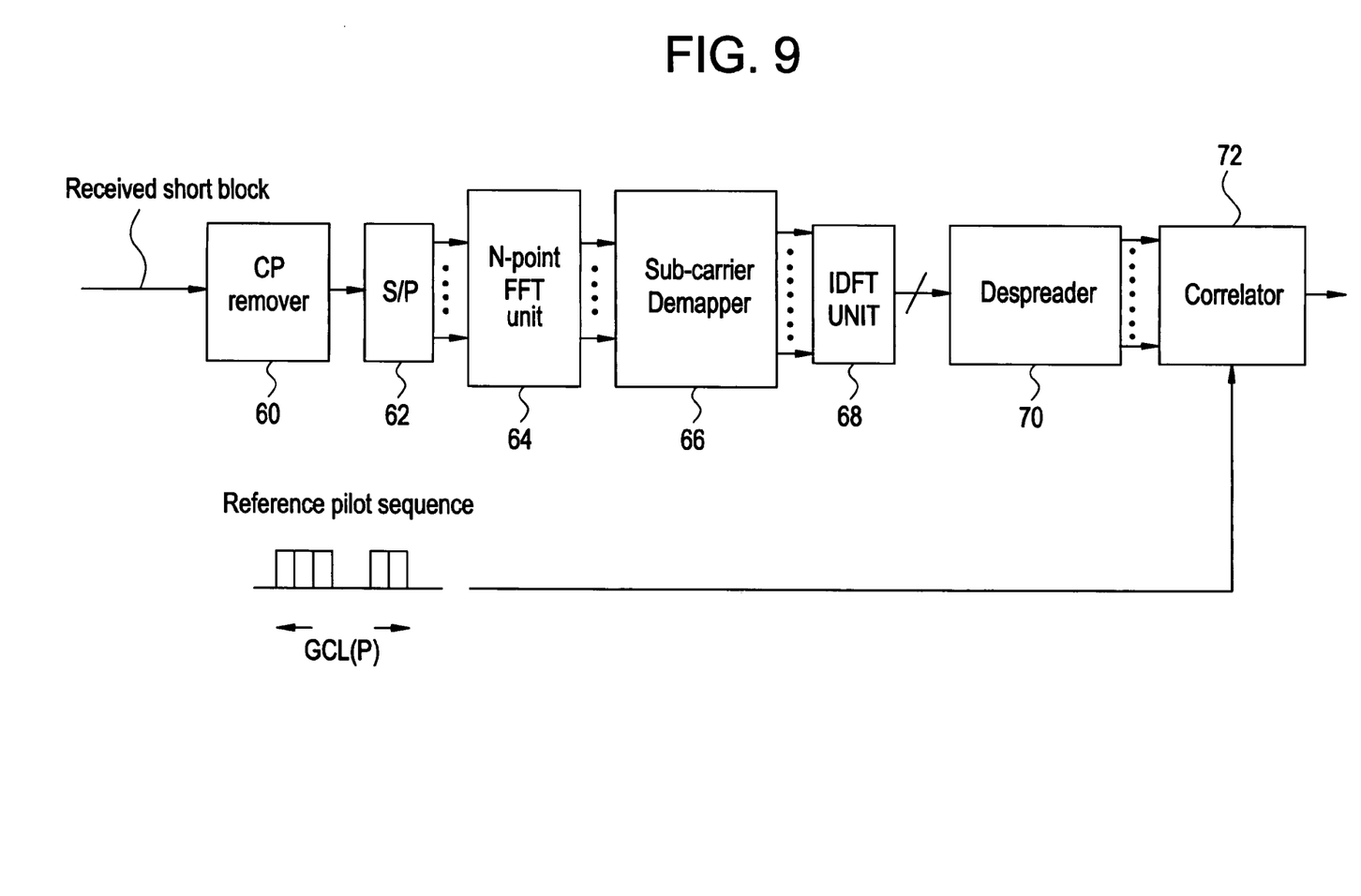
FIG. 9 illustrates an example embodiment of the receiver structure according to the present invention.

Having covered the transmitter structures above in detail, the receiver structure according to embodiments of the present invention will now be described. FIG. 9 illustrates an example embodiment of the receiver structure according to the present invention. As shown, a CP remover 60 removes the CP in the received signal, and a serial-to-parallel converter 62 converts the serial time domain signal to parallel. An N-point FFT unit 64 then converts the parallel time-domain signal to the frequency domain. A sub-carrier demapper 66 performs the inverse operation of the sub-carrier mapper 14 to obtain the original frequency domain samples. In the embodiment shown in FIG. 9, these samples are converted back to the time domain by the inverse DFT (IDFT) unit 68. A despreader 70 then performs the inverse operation of the spreader 10 on the time domain sequence output from the IDFT 68. As will be appreciated, instead of performing the despreading operation in the time domain, the despreading may be performed in the frequency domain. For example, this may be accomplished by performing the inverse of the operations performed by the frequency domain spreader 32 and the P-point DFT unit 30.

After converting the received short block to a reference sequence, the channel is estimated in the code domain. The raw channel estimate is obtained by correlating the received pilot sequence output from the despreader 70 with the reference GCL pilot sequence at a correlator 72. Because the node B assigned the GCL sequence to the UE, the node B knows the GCL sequence to be received. The raw channel estimate is converted to frequency domain responses for each data subcarrier. The N-point SB FFT may be used followed by frequency-domain upsampling and smoothing for the two adjacent sub-carriers. Alternatively, a long-block (LB) FFT may be used to obtain frequency domain channel responses for all used data sub-carriers. Frequency-domain interpolation may be applied for sub-carriers within the channel coherence bandwidth. Time-domain interpolation may be applied in conjunction with frequency domain smoothing to improve the channel estimation performance when the channel is time-varying within the sub-frame. The interpolation may be done for each sub-carrier. Instead of 2 one-dimensional channel interpolators (frequency and time domain), a single two-dimensional channel interpolator may be used. The interpolation is done on a time-frequency grid for the signals, after conversion to the frequency domain channel response.

The estimated frequency-domain channel response is used as the input to an equalizer. The equalizer may be a single-tap frequency-domain equalizer. Either a zero-forcing (ZF) or a minimum mean-squared error (MMSE) equalizer may be used.

Next, assignment of sequences to node Bs and sequence reuse will be discussed. Typically when discussing the assignment of frequencies or sequences to node Bs, the assignment is discussed in terms of the cell (e.g., geographic area handled by the node B). Accordingly, this typical form for discussing such assignments will be used here.

Figure 10:
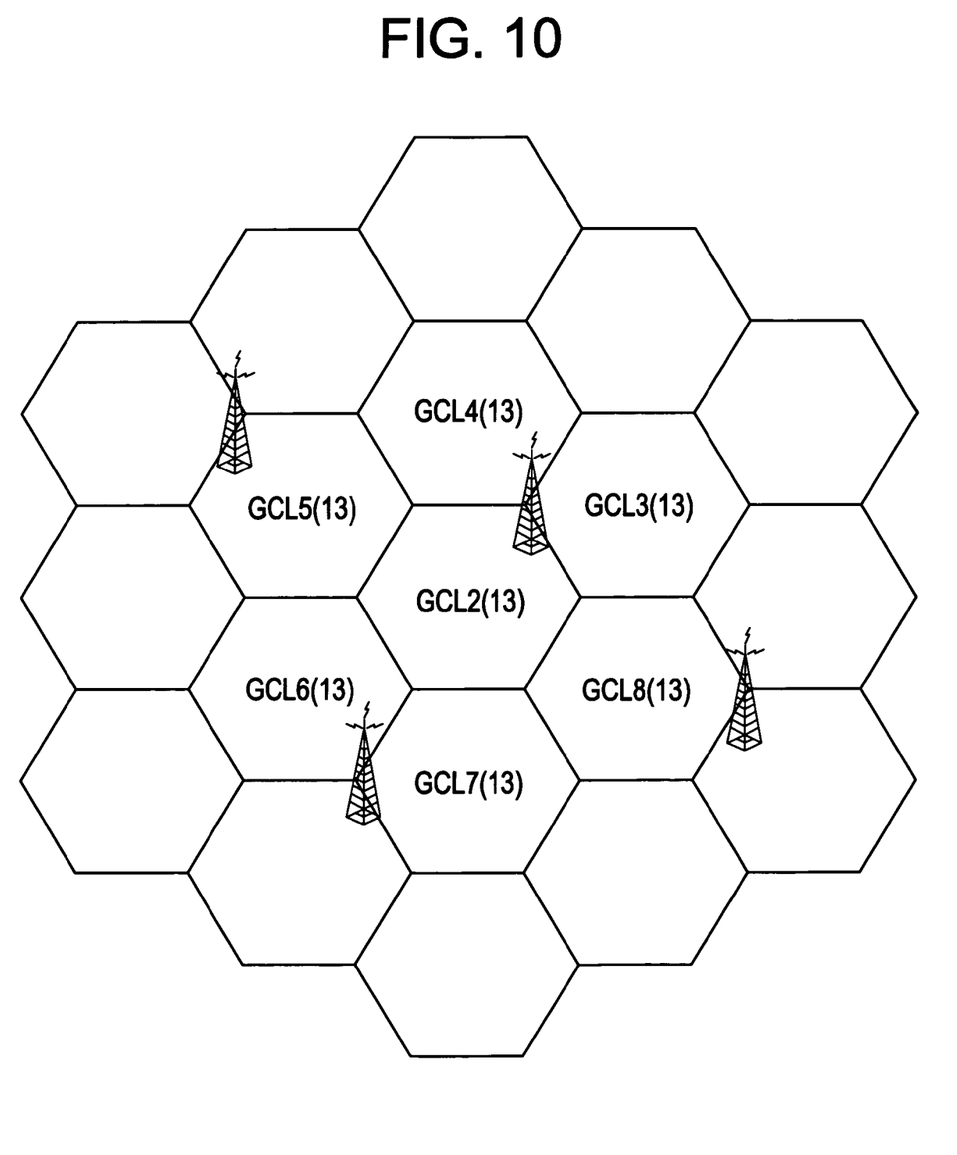
FIG. 10 illustrates a sequence assignment scheme according to an embodiment of the present invention.

For in-cell users, the same GCL sequence may be reused without causing same-cell interference because the UEs have different sub-carrier assignments. A pilot or reference sequence can be allocated initially when a user is admitted to a cell, and does not need to be scheduled, which simplifies user configuration. FIG. 10 illustrates a pilot sequence assignment rule for a 3 sector system with clover-leaf cell shape. As an example, a GCL sequence of length 13, denoted as GCL (13) is used. There are 11 different GCL sequences of length 13. As shown, the different GCL sequences of length 13 are indicated by the number k in FIG. 10, where k is in the form GCLk(13). The variable k may be the same variable k discussed above with respect to equation (1). As shown, each cell assigns in-cell UEs the same GCL sequence, but the different cells in the reuse group assign different GCL sequences. The reuse group is then repeated throughout the system. The assignment scheme shown in FIG. 10 allows 1/7 reuse of a GCL sequence. As will be appreciated, different length GCL sequences will allow for different reuse schemes based on the number of different GCL sequences of that length.

One main difference between the frequency-domain CAZAC sequence and the time-domain CAZAC sequence is in the achievable processing gain. Since the channel can be assumed to be relatively constant over the SB, processing gain (PG) is obtained by accumulating over the length of the pilot sequence. For P=13, processing gain of $PG=10\times\log_{10}(13)=11.1$ dB is possible. For high Doppler, the coherence time may become smaller than the short block length, in which case, a coherent accumulation window for the correlator may need to be reduced. This will result in a reduction in processing gain.

Note that equivalent gain is not obtained by using the CAZAC sequence in the frequency domain.

For a GSM TU channel profile, coherence bandwidth defined as $\frac{1}{2}\tau_{max}$ is approximately 100 kHz. This corresponds to 3 pilot sub-carriers. For localized mapping using a conventional FDM pilot, processing gain of $10\log_{10}(3)=4.8$ dB is possible.

For distributed mapping, in general, the pilot sub-carriers are separated by L-1 zeros and typically, uncorrelated. No processing gain may be obtained for distributed mapping.

It has been argued that FDM pilots suffer from co-channel interference at the cell edge. The problem exists when comb-shaped pilot tones are used or a frequency-domain CAZAC sequence is used. In this case, each pilot tone collides with the pilot of a user in a neighboring cell, who is sharing the same resource block. However, the low constant cyclic cross-correlation property of GCL sequences allows co-channel interference suppression in the code domain, thus allowing accurate channel estimation in the presence of strong interferer. This allows advanced receivers such as inter-cell pilot interference cancellation or channel estimation for handover decision without using the full-bandwidth CDM pilot structure.

Embodiments of the present invention provide a 'reduced-length DFT-precoded sequence' as the FDM pilot signal. A GCL sequence may be suitable as the basis for generating the FDM pilot sequences. Compared with the comb-shaped FDM pilot tones, or the frequency-domain CAZAC sequence, the pilot structure of the present invention solves the problem of pilot collision due to dominant interferers by exploiting the cyclic cross-correlation property. Some of the advantages of using the proposed sequence include:

1. By using the DFT-precoded pilot sequence, the channel may be estimated in the time domain and converted to frequency domain. For most UE velocities, coherence time of the channel does not exceed the pilot block length. Thus, processing gain corresponding to the sequence length is possible by coherently accumulating raw sample-rate channel estimates over the length of the pilot sequence.

2. By using bit-by-bit spreading of the sequence to generate the FDM reference to cover users assigned multiple resource blocks, the same sequence may be reused for all in-cell users, irrespective of the number of resource blocks.

3. By using the low cyclic cross-correlation property of GCL sequences, dominant co-channel interferers can be suppressed. Such gain is not possible with other frequency-domain CAZAC pilot structure, since the frequency-domain CAZAC sequence does not have the desired cross-correlation property in the time domain.

4. Although the proposed pilot is a FDM pilot, it offers the advantages of the CDM pilot. These include accurate channel estimation for pilot co-channel interference cancellation and handover measurement. However, since the sequence length is reduced, cochannel interference suppression characteristic may not be as good as in the full-bandwidth CDM pilot.

5. Both distributed and localized data mapping is supported by the pilot structure of the present invention. A one-to-one correspondence between the sub-carrier mapping of the data and the pilot may be defined.

6. The pilot structure preserves the advantages of the FDM pilot structure such as in-cell orthogonality between users (even for high-mobility users), and elimination of the near-far problem.
7. The sequences can be reused for all in-cell users. No per-user scrambling is required. This simplifies configuration since per-user configuration information is reduced.
8. The sequence may also be used as an uplink reference signal structure for CQI estimation and coherent demodulation.
    a. CQI estimation:
        i. Use a full-bandwidth CDM pilot in one of the SBs for CQI estimation for channel-dependent scheduling. 6 cyclically-shifted orthogonal sequences may be used to enable CQI estimation for 6 users. For larger number of users, the CQI pilots can be time-multiplexed to different sub-frames.
        ii. Alternatively, FDM pilots may be used in one of the SBs for CQI estimation.
    b. Coherent demodulation:
        i. The 'reduced-length DFT-precoded constant amplitude sequence' may be used as the FDM pilot for the advantages explained above.
9. The DFT-precoded FDM pilot can be used along with the CQI pilots to improve channel estimation performance. The CQI pilot can be either a full-bandwidth orthogonal CDM pilot or the frequency-domain FDM pilots. In the absence of dominant co-channel interference, the channel estimation quality among the three possible pilot blocks may be comparable. These gains are coming from a combination of processing gain and the gain obtained from unused tones.

The invention being thus described, it will be obvious that the same may be varied in many ways. Such variations are not to be regarded as a departure from the invention, and all such modifications are intended to be included within the scope of the invention.

I claim:

1. A method of assigning uplink reference signals to users in a group of cells, comprising:
    assigning a first constant amplitude sequence having low cyclic cross correlation to each user in a first cell of the group of cells, each user being assigned the first sequence;
    assigning simultaneously transmitting users in the first cell to different sub-carriers;
    assigning a second constant amplitude sequence having low cyclic cross correlation to each user in a second cell of the group of cells, each user in the second cell being assigned the second sequence, the first sequence and the second sequence being different sequences, the first cell and the second cell being adjacent; and
    assigning simultaneously transmitting users in the second cell to different sub-carriers, the sub-carriers to which the simultaneously transmitting users of the second cell are assigned overlapping in frequency with the sub-carriers to which the simultaneously transmitting users of the first cell are assigned.

2. The method of claim 1, wherein the first and second sequences have a same length.

3. The method of claim 2, wherein the length is an odd number.

4. The method of claim 2, wherein the length is 13.

5. The method of claim 2, wherein the length is an even number.

6. The method of claim 5, wherein the sequence is generated by truncating an odd length sequence.

7. The method of claim 2, wherein the length is 12.

8. The method of claim 1, wherein the first and second sequences have different lengths.

9. The method of claim 8, wherein the first and second sequence have lengths differing by one.

10. The method of claim 9, wherein the first sequence has a length of 12 and the second sequence has a length of 13.

11. The method of claim 1, wherein the first and second sequences are generalized chirp like (GCL) sequences.

12. The method of claim 11, wherein the first and second sequences are Zadoff-Chu GCL sequences.

13. The method of claim 1, wherein
    the assigning sub-carriers to simultaneously transmitting users in the first cell step assigns at least a minimum number of sub-carriers to each simultaneously transmitting user; and
    the assigning sub-carriers to simultaneously transmitting users in the second cell step assigns at least the minimum number of sub-carriers to each simultaneously transmitting user.

14. The method of claim 13, wherein the minimum number is 12.5.

15. The method of claim 13, wherein the first and second sequences have lengths dependent on the minimum number.

* * * * *